United States Patent
Grisendi et al.

(10) Patent No.: US 10,590,868 B2
(45) Date of Patent: Mar. 17, 2020

(54) SYSTEM FOR CONTINUOUS CONTROL OF AIR-FUEL RATIO WITH IONIZATION CURRENT

(71) Applicant: EMAK S.P.A., Bagnolo in Piano (RE) (IT)

(72) Inventors: Alessandro Grisendi, Reggio Emilia (IT); Walter Lo Casale, Reggio Emilia (IT); Gianluca Barbolini, Modena (IT); Marco Ferrari, Carpi (IT)

(73) Assignee: EMAK S.P.A., Bagnolo in Piano (RE) (IT)

( * ) Notice: Subject to any disclaimer, the term of this patent is extended or adjusted under 35 U.S.C. 154(b) by 86 days.

(21) Appl. No.: 15/571,486

(22) PCT Filed: May 2, 2016

(86) PCT No.: PCT/IB2016/000574
§ 371 (c)(1),
(2) Date: Nov. 2, 2017

(87) PCT Pub. No.: WO2016/178072
PCT Pub. Date: Nov. 10, 2016

(65) Prior Publication Data
US 2018/0135540 A1    May 17, 2018

(30) Foreign Application Priority Data
May 7, 2015   (IT) .............................. RE2015A0037

(51) Int. Cl.
  *F02D 35/00*    (2006.01)
  *F02D 41/06*    (2006.01)
  (Continued)

(52) U.S. Cl.
  CPC ....... *F02D 35/0053* (2013.01); *F02D 35/021* (2013.01); *F02D 41/06* (2013.01);
  (Continued)

(58) Field of Classification Search
  CPC .... F02D 35/0053; F02D 35/021; F02D 41/34; F02D 41/1454; F02D 41/06; F02D 2041/286; F02D 2400/04; F02D 41/22; F02D 41/1482; F02D 2400/06; F02D 41/2454; Y02T 10/44
  See application file for complete search history.

(56) References Cited

U.S. PATENT DOCUMENTS 5,425,339 A * 6/1995 Fukui ................... F02D 35/021
                                                   123/406.26
5,526,793 A * 6/1996 Johansson ............. F02B 77/085
                                                   123/198 D
(Continued)

FOREIGN PATENT DOCUMENTS

| DE | 10236979 C1 | 8/2003 |
|----|-------------|--------|
| EP | 2574760 A1 | 4/2013 |
| WO | 2013017920 A1 | 2/2013 |

*Primary Examiner* — Jacob M Amick
*Assistant Examiner* — Charles Brauch
(74) *Attorney, Agent, or Firm* — Volpe and Koenig, P.C.

(57) ABSTRACT

A control system for carburation of an internal combustion engine in use conditions comprising following activities: starting the engine with a value of $\lambda$ equals $\lambda_0 = \lambda_T$; constructing a curve $c_i(\alpha)$ of the ionization current $\alpha$ as a function of the angular position a of the crank shaft; selecting, on this curve $c_i(\alpha)$, a number of points at intervals $\Delta\alpha$ of the rotation angle a; calculating value z, equal to integral from 0 to 360° of the curve $c_i(\alpha)$, is done by summing products $\Delta\alpha \times c_i$ for all preselected points; interrupting supply of fuel for some cycles in order to externally modify factor $\lambda_0$ and take it to value $\lambda_1$; for value $\lambda_1$ constructing curve $c_i(\alpha)$ and calculating value $z_1$; calculating difference $\Delta_z = z_1 - z_0$, and if the difference is $>\Delta_{zref}$ in absolute value, intervening on carburation by increasing the quantity of fuel injected in a case of a positive difference (lean mixture) and by reducing the quantity of fuel injected in a case of a negative difference (rich mixture).

9 Claims, 1 Drawing Sheet

(51) Int. Cl.
　　　*F02D 41/14*　　(2006.01)
　　　*F02D 41/34*　　(2006.01)
　　　*F02D 35/02*　　(2006.01)
　　　*F02D 41/22*　　(2006.01)
　　　*F02D 41/24*　　(2006.01)
　　　*F02D 41/28*　　(2006.01)

(52) U.S. Cl.
　　　CPC ......... *F02D 41/1454* (2013.01); *F02D 41/34* (2013.01); *F02D 41/1482* (2013.01); *F02D 41/22* (2013.01); *F02D 41/2454* (2013.01); *F02D 2041/286* (2013.01); *F02D 2400/04* (2013.01); *F02D 2400/06* (2013.01); *Y02T 10/44* (2013.01)

(56) References Cited

U.S. PATENT DOCUMENTS

| | | | |
|---|---|---|---|
| 5,769,049 A | | 6/1998 | Nytomt et al. |
| 5,803,047 A | * | 9/1998 | Rask .................... F02D 35/021 123/406.37 |
| 5,992,386 A | | 11/1999 | Nytomt et al. |
| 6,006,727 A | * | 12/1999 | Katashiba ............ F02D 35/021 123/435 |
| 6,029,627 A | | 2/2000 | VanDyne |
| 2003/0230074 A1 | * | 12/2003 | Huang .................. F02D 35/021 60/285 |
| 2004/0084026 A1 | * | 5/2004 | Zhu ....................... F01N 3/2006 123/435 |
| 2008/0065306 A1 | | 3/2008 | Takahashi et al. |
| 2013/0139786 A1 | * | 6/2013 | Glugla ................ F02D 41/0087 123/321 |

\* cited by examiner

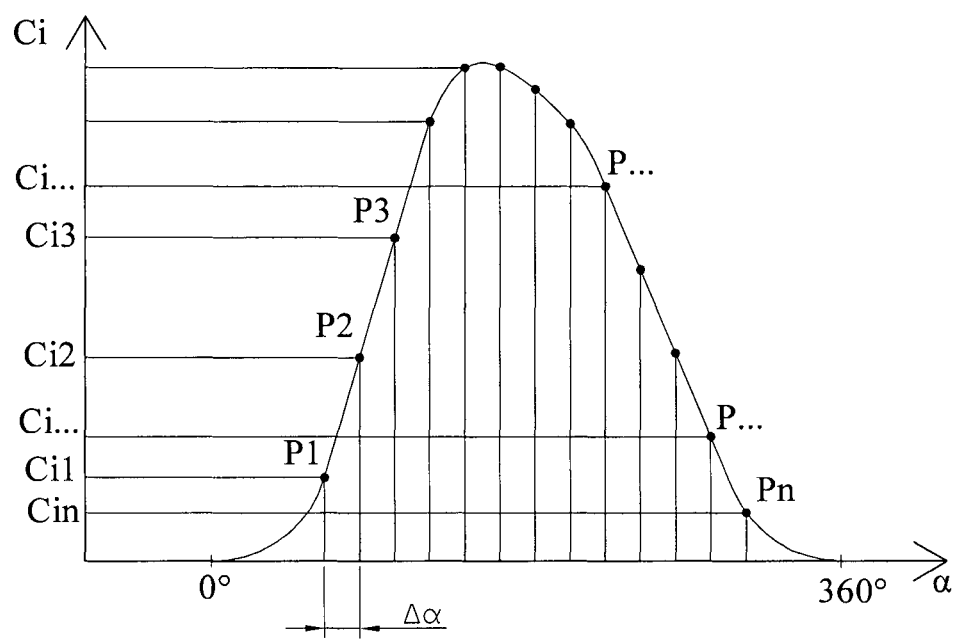

SYSTEM FOR CONTINUOUS CONTROL OF AIR-FUEL RATIO WITH IONIZATION CURRENT

TECHNICAL FIELD

The present invention relates to controlling a carburation in internal combustion engines, in particular internal combustion engines having a spark ignition (e.g. petrol engines), for example in small two-stroke engines used for portable tools in the agricultural/forestry sectors, such as brush cutters, power saws and the like.

PRIOR ART

Carburation is taken to mean the ratio between the comburent (air) and the combustible in the mixture that is fed to the combustion chamber of the engine, usually indicated as A/F or A/C.

The correct A/F ratio is essential for good engine operation, as a function of both the performance and in order to reduce toxic emissions in exhaust, and in petrol engines it is always close to, but not equal to, the theoretical ratio of combustion, or the stoichiometric ratio.

The parameter used for defining the combustion ratio is the factor $\lambda$ which represents the quotient between the real value of the air/fuel ratio and the stoichiometric ratio (about 14.7): $\lambda=1$ corresponds to the stoichiometric ratio, $\lambda<1$ indicates insufficient air (rich mixture), $\lambda>1$ indicates excessive air (lean mixture).

The value of $\lambda$ is strictly linked to the presence of CO in the exhaust gases, the relation between the two magnitudes being illustrated in the following table:

| CO % | 1 | 2 | 3 | 4 | 5 | 6 | 7 | 8 | 9 |
|---|---|---|---|---|---|---|---|---|---|
| $\lambda$ | 0.98 | 0.94 | 0.91 | 0.87 | 0.84 | 0.80 | 0.77 | 0.73 | 0.70 |

Engines leave the factory with a standard calibration, which includes regulating the carburation so that factor $\lambda$ is always constant and equal to a predetermined carburation value $\lambda_T$.

In small two-stroke engines, for example those used in portable tools, such as power saws, croppers, brush cutters or the like, the calibration value $\lambda_T$ of factor $\lambda$ is normally comprised between 0.85 and 0.95, i.e. corresponding to a slightly rich fuel mixture, i.e. having an air deficit.

For values of factor $\lambda$ of lower than those indicated, there is a loss of power and an excess of fumes in exhaust, while for values above it, there can be dangerous overheating of the engine.

A problem connected with this approach consists however in the fact that the calibrating value $\lambda_T$ of the factor $\lambda$ is suitable only for engine operation at sea level and in optimum use conditions.

If the engine is operating beyond these conditions, the calibration value $\lambda_T$ of factor $\lambda$ is no longer able to guarantee low consumption and lower toxic emissions.

This problem is particularly relevant for small two-stroke engines, used for example for portable tools in the agricultural/forestry sector, such as brush cutters, power saws and the like, which are often over-stressed, used in very poor atmospheric conditions and often at height and with various types of fuel and oil.

For these engines it is therefore necessary to substantially continuously match factor $\lambda$ to the effective use conditions.

For this purpose, in the past control systems of the carburation have been disclosed which use the ionization current as the parameter indicating factor $\lambda$.

One of these carburation control systems is described for example in document U.S. Pat. No. 6,029,627. Another control system using the ionization current for regulating the carburation is described in document WO 2013/017920.

The known control systems, though effective, have some not insignificant drawbacks, among which the most relevant is the time required to bring the regulation of factor $\lambda$ to completion.

Further, the results are affected by wear and/or spark-plug fouling, which tends to reduce the ionization current $c_i$.

SUMMARY OF THE INVENTION

An aim of the present invention is to disclose a regulating system of the factor $\lambda$ with much more rapid intervention times, which is suitable for a continuous and automatic intervention during the whole operating period of the engine, and which is impervious to wear and fouling of the spark plug. These and other aims are attained by a system having the characteristics recited in independent claim 1. The dependent claims delineate preferred or particularly advantageous aspects of the invention.

In particular, an embodiment of the present invention relates to a control system of the carburation of an internal combustion engine comprising following activities:

a. operating the engine with an air/fuel ratio of a predetermined initial value;

b. for the initial value of the air/fuel ratio (i.e. operating the engine at an initial value of the air/fuel ratio), constructing a first curve representing the ionization current as a function of the angular position of a crankshaft of the engine;

c. calculating a value equal to an integral of the first curve in a predetermined angular interval of the crankshaft;

d. modifying the air/fuel ratio of the engine, bringing the ratio to a second value different to the initial value;

b. for the initial value of the air/fuel ratio (i.e. operating the engine at a second value of the air/fuel ratio), constructing a second curve representing the ionization current as a function of the angular position of a crankshaft;

c. calculating a value equal to an integral of the second curve in an angular interval of the crankshaft that is equal to the preceding angular interval;

g. calculating a difference between the value of the integral of the second curve and the value of the integral of the first curve;

h. if the difference has an absolute value of greater than a predetermined threshold value, intervening on the carburation to regulate the quantity of fuel injected.

In practice, the control system of the present invention includes carrying out an efficiency test: if the difference between the two values of the integral of the ionization current has an absolute value that is lower than or equal to the threshold value, this means that the initial value of the air/fuel ratio enables obtaining a good compromise between engine performance and quality of polluting emissions, so that the engine can continue to operate with the initial value; if on the other hand the difference between the two values of the integral of the ionization current has an absolute value that is greater than or equal to the threshold value, this means that the initial value of the air/fuel ratio does not enable obtaining a good compromise between engine performance and quality of polluting emissions, so that the control system will then cause the engine to operate with a different quantity of fuel (with respect to the quantity relating to the corresponding initial value of the air/fuel ratio).

This efficiency test can be repeated continuously during engine operation, using, each time, as the initial value of the air/fuel ratio, the one maintained constant or possibly regulated at the end of the preceding test, in this way obtaining a continuous control of the air/fuel ratio of the engine which therefore remains constantly comprised within an interval of values which guarantee a good compromise between engine performance and quantity of polluting emissions.

In an aspect of the invention, a first initial value of the air/fuel ratio is comprised between 75% and 85% of the value of the stoichiometric ratio, i.e. the factor λ of the carburation can be comprised between 0.75 and 0.85.

In this way it is guaranteed that the regulation starts from an air/fuel ratio value that, at least in standard operating conditions, is very close to the optimal value, thus reducing regulating times also in the other conditions.

In a further aspect of the invention, the second value of the air/fuel ratio is equal to the sum of the initial value and a predetermined quantity.

This detail provides a simple and repeatable criterion for varying the air/fuel ratio with respect to the initial value during the efficiency test, so as to be able to acquire valid indications on the effective efficiency of the carburation.

In an aspect of the invention, in order to modify the air/fuel ratio the supply of fuel can be interrupted for one or more engine cycles, for example for at least three engine cycles.

In this way the integral of the ionization current calculated for the second value of the air/fuel ratio is not influenced by the combustions previously effected, thus improving the reliability and the robustness of the efficiency test.

In a further aspect of the invention, the predetermined angular interval on which the integral of the ionization current is calculated is 360° of crankshaft rotation.

This enables keeping in consideration the variation in the ionization current during a whole engine cycle.

In an aspect of the invention, the threshold value of the difference between the values of the integral can be equal to or less than 8.32 μA*rad.

This threshold value provides a valid criterion for establishing whether the initial value of the combustion ratio is effectively within an interval of optimal value for carburation.

In a further aspect of the invention, the value of the integral of each curve representing the ionization current is calculated by carrying out steps of:
  selecting, on the curve, a number of points at predetermined intervals of the rotation angle of the crankshaft;
  calculating for each point the product of the value of the ionization current at that point for the respective angular interval;
  summing the products relative to all the points.

This calculation mode provides a very simple and rapid solution for calculating the integral of the ionization current with a computational effort that is relatively modest.

In a further aspect of the invention, the regulating of the quantity of fuel injected includes increasing the quantity of fuel injected in a case of a negative difference and reducing the quantity of fuel injected in a case of a positive difference.

This solution effectively enables increasing the quantity of fuel if it emerges from the efficiency test that the initial value of the air/fuel ratio configures an excessively lean mixture and, on the other hand, reduces the quantity of fuel if from the efficiency test it emerges that the initial value of the air/fuel ratio configures an excessively rich mixture with respect to the mixture than enables a good compromise between performance and polluting emissions.

In an aspect of the invention, the modification of the air/fuel ratio is carried out at regular time intervals.

In this way the efficiency test is repeated in cadence and with regularity during engine operation.

For example, the time intervals can have a duration comprised between 10 and 20 seconds.

With this solution the air/fuel ratio is effectively maintained strictly under control.

By regulating the carburation as delineated in the above, it follows that the value of the integral of the ionization current (i.e. the value of the integral of the curve of the ionization current) can be calculated at each engine cycle, i.e. that the value of the integral of the ionization current is constantly monitored during engine operation.

In an aspect of the invention, should the calculated value of the integral of the ionization current exceed a predetermined threshold value, for example a value of 261 μA*rad, and should the calculated value be greater than the above-mentioned threshold value for a time (i.e. a number of engine cycles) of greater than a predetermined value, for example 20 engine cycles, it means that the engine is functioning in critical conditions.

In these circumstances a safety procedure can be activated, which controls the carburation on the basis of the engine speed, and replaces the control procedure initially described.

In practice, this safety procedure can include measuring the engine speed, typically the number of revolutions performed by the crankshaft in the time unit, and regulating the quantity of fuel injected so that the engine speed is maintained constantly at or almost at a predetermined target value, for example 10000 rpm To do this, the system can for example use a feedback control which involves calculating the difference between the measured value of the engine speed and the target value, and regulating the supply of fuel so as to minimize the difference.

This safety procedure can also be activated in other circumstances, for example when the engine temperature exceeds a predetermined maximum value, for example 270° C., or when the number of engine revolutions exceeds a respective maximum value, for example 10000 rpm.

In a further aspect of the invention, should the calculated value of the integral of the ionization current fall below a predetermined threshold value, for example a value of 1.75 μA*rad, and should this calculated value remain below the above-mentioned threshold value for a time (i.e. a number of engine cycles) greater than a predetermined value, for example 20 cycles, it means that probably the measurement of the ionization current (typically carried out via the spark plug) is no longer sufficiently reliable for controlling the carburation (for example because the spark plug is fouled).

In these circumstances it is therefore possible to activate a further safety procedure which, in replacing the control procedure of the carburation initially described, includes halting the engine, for example by supplying the engine with the maximum quantity of fuel up to flooding it.

BRIEF DESCRIPTION OF THE DRAWINGS

Further advantages and constructional characteristics of the invention will emerge from the detailed description that follows, which relates to a particular preferred embodiment of the invention given by way of non-limiting example.

FIG. 1 is a curve $c_i(\alpha)$ that shows the progression of the ionization current $c_i$ in the cylinder of an engine as a function of the angle $\alpha$ of the crankshaft, for a certain value of the factor $\lambda$ and cleaned of the irregularities which occur at the moment of the ignition discharge.

DETAILED DESCRIPTION

The control system of the present invention is configured for controlling the carburation of an internal combustion engine, i.e. the air/fuel ratio or equivalently the factor $\lambda$ at which the engine is operated.

The factor $\lambda$ is the quotient between the value of the air/fuel ratio at which the engine is operating and the stoichiometric ratio (i.e. 14.7).

The engine is preferably a spark-ignited small engine (for example petrol), for example a two-stroke engine for portable tools, such as power saws, croppers, brush cutters or the like.

The engine therefore further comprises at least a cylinder in which an alternating piston is housed, which is in turn connected to a crankshaft, so that the alternating motion of the piston, due to the combustion of the air/fuel mixture internally of the cylinder (i.e. the combustion chamber) is transformed into a rotation of the crankshaft.

The engine is carburetor-fed. The carburetor is essentially made up of a main conduit which places the whole cylinder in communication with the outside. Along the progression of this conduit there are normally situated a valve, which can be a butterfly valve, which has the function of regulating the air flow internally of the conduit, and an inlet system of the fuel. The fuel inlet system generally comprises a choke in the main conduit and a nozzle located at the choke position, which is connected to a tank for the fuel. In this way, the nozzle is able to dispense the fuel which is aspirated by the tank thanks to the depression created by Venturi effect by the choke.

The inflow of fuel to the dispensing nozzle can be controlled by means of a valve, for example a solenoid valve, which is positioned along the conduits connecting the tank to the dispensing nozzle. This valve can be an ON-OFF valve (i.e. able only to completely open or close the communication between the tank and the nozzle), which is piloted so as to open and close at high frequency, for example by means of a PWM signal (pulse-width modulation). In this way, by varying the average opening and closing time of the valve, for example by changing the duty-cycle of the PWM signal, it is advantageously possible to regulate the average quantity of fuel that is fed to the engine.

The control system of the present invention is based on the measurement, while the engine is operating with a certain value of factor $\lambda$, the ionization current $c_i$ as a function of the rotation angle of the crankshaft at each cycle of the engine [$c_i = f(\alpha)$], where it is not the variation $\Delta_{ci}$ among the ionization current values being monitored, but the variation of a parameter z which expresses the value of the integral from 0° to 360° of the curve $c_i = f(\alpha)$.

The phenomenon of ionization arises internally of the combustion chamber, where ions are generated by effect of the oxidation reaction of the fuel and by the action of the heat generated by combustion.

In the presence of two differently-charged poles located in the combustion chamber, between the poles a migration of ions takes place, giving rise to a passage of current which takes the name of ionization current $c_i$.

It is possible to use, as poles, the electrodes of the spark plug of the fuel mixture.

The ionization current $c_i$ is the current transiting between the two electrodes, measured from outside the engine, i.e. through the electric circuit that heads to the spark plug.

The current measuring systems a are known and therefore will not be described in detail.

The system is conducive to a continuous monitoring of the carburation of the engine during its use, for example for calculating the value of the parameter z at each engine cycle.

In this context consider the case, by way of example, in which, during the carrying out of a certain engine cycle, the engine is functioning with a carburation corresponding to the value of factor $\lambda$ of $\lambda_0$, where $\lambda_0$ is a predetermined value which we shall call "initial".

The initial value ($\lambda_0$) of factor $\lambda$ usually corresponds to a predetermined duty-cycle of the valve.

For this initial value ($\lambda_0$) the curve [$c_i = f(\alpha)$] is constructed and the integral $z_0$ from 0° to 360° of the curve $c_i = f(\alpha)$ is calculated, i.e. the value of the integral of the ionization current during the current engine cycle.

During a subsequent engine cycle, the value of factor $\lambda$ is automatically modified and the value of the parameter z is recalculated, i.e. the value of the integral of the ionization current is recalculated during the engine cycle performed with the new value of factor $\lambda$.

The modification of the value of factor $\lambda$ is performed by interrupting the supply to the engine, or rather for a few cycles of the engine, for example for three or more consecutive engine cycles.

In practice, the ON-OFF valve that connects the tank to the nozzle of the carburetor is kept closed for the above-mentioned time interval, for example for three or five consecutive engine cycles, so that the engine is supplied only with the quantity of fuel remaining in the circuit, overall causing an increase in the value of $\lambda$.

In this way a modification of the factor $\lambda$ of the initial value $\lambda_0$ ensues, to a different value $\lambda_1$, still greater than $\lambda_0$ to which the calculation of a new value $z_1$ of the parameter z corresponds.

For example, the value $\lambda_1$ can be calculated as the sum between the initial value ($\lambda_0$) and a predetermined quantity $\Delta_\lambda$, where this quantity $\Delta_\lambda$ can be equal to a constant or predetermined value of the factor $\lambda$, for example a positive value of less than or equal to 0.05.

In this way it will ensue that value $\lambda_1$ is always greater than value $\lambda_0$, i.e. it will always correspond to a slightly leaner mixture.

By comparing the values $z_0$ e $z_1$ the difference is calculated $\Delta_z = z_1 - z_0$ and if the absolute value is greater than a certain reference value $\Delta_{zrif}$ this means that the carburation is not correct and needs modifying.

For example, reference value $\Delta_{zrif}$ can be 8.32 µA*rad, so that the difference between the two values $z_0$ and $z_1$ of the integral is acceptable only if it is lower than the reference value ($\Delta_z < 8.32$ µA*rad).

In particular if the absolute value of $\Delta_z$ is $<\Delta_{zrif}$ it is concluded that the carburation is correct. In this case, in the control system, in the subsequent engine cycles, the engine will return to operating with the initial value $\lambda_0$ of factor $\lambda$, without interventions on the carburation.

If the absolute value of $\Delta_z$ is $>\Delta_{zrif}$ and $\Delta_z$ is a negative value, this means that the air/fuel mixture is too lean. In this case, the control system of the engine proceeds to enrich the air/fuel mixture, for example by a fixed quantity. In other words, the control system acts so that in the following engine cycles, the engine is operated with a greater quantity of fuel with respect to the fuel corresponding to the initial value $\lambda_0$, i.e. with a new value of factor $\lambda$ which is lower than $\lambda_0$.

On the other hand, if the absolute value of $\Delta_z$ is $>\Delta_{zrif}$ and $\Delta_z$ is a positive value, this means that the air/fuel mixture is too rich. In this case, the control system of the engine proceeds to make the air/fuel mixture leaner, for example by a fixed quantity. In other words, the control system acts to that in the following engine cycles, the engine is operated with a lower quantity of fuel with respect to the fuel corresponding to the initial value $\lambda_0$, i.e. with a new value of factor $\lambda$ which is higher than the initial value $\lambda_0$. This new value of factor $\lambda$ might coincide with value $\lambda_1$ but might also be different.

In practice, the above-described operations represent an efficiency test on the initial value ($\lambda_0$) of factor $\lambda$. If the difference between the two values of the integral of the ionization current has an absolute value that is lower than or equal to the threshold value, this means that the initial value $\lambda_0$ of factor $\lambda$ enables obtaining a good compromise between engine performance and quantity of polluting emissions, so that the engine can continue to operate with the initial value $\lambda_0$. If on the other hand the difference between the two values of the integral of the ionization current has an absolute value that is greater than or equal to the threshold value, this means that the initial value $\lambda_0$ of factor $\lambda$ does not enable obtaining a good compromise between engine performance and quality of polluting emissions, so that the control system will then cause the engine to operate with a different quantity of fuel and therefore a new value of factor $\lambda$.

This efficiency test is repeated several times during engine operation, using each time, as the initial value $\lambda_0$ of factor $\lambda$, the value at which the engine was functioning immediately before, i.e. the one resulting (maintained constant or regulated) at the end of the last efficiency test previously-carried out.

In particular, the above operations (i.e. the efficiency test in its entirety) can be repeated at regular intervals for the whole operating time of the engine, for example every 15-20 seconds; so that the carburation is continually adapted and maintained close to an optimal value of factor $\lambda$ as a function of the conditions of use and the environmental situation in which the engine is operating.

On first carrying out the efficiency test, for example on starting the engine, the initial value $\lambda_0$ of factor $\lambda$ can be equal to a predetermined calibration value $\lambda_T$, which can be comprised between 0.75 and 0.85.

Further characteristics and advantages of the invention will more fully emerge from a reading of the following example, for which a single-cylinder two-stroke engine was used having following characteristics:

| | |
|---|---:|
| cubic capacity | 40.2 cc |
| max output | 10,500 rpm |
| max power | 2.1 Hp |
| Working output | 8500 rpm |

The mapping of the engine was carried out at origin, assuming use of the engine at sea level, with an operating temperature of around 20° C.

In these conditions a calibration value of factor $\lambda$ was adopted of $\lambda_T$=0.8, to which correspond CO emissions of 6% and a maximum value of the ionization current of $c_i$=0.6 µA.

The first use of the engine was at a height of 2000 metres above sea level, with an operating temperature of close to 0° C.

The carburation of the engine thus requires an adjustment, which is done in the following way.

On first starting up the engine, the control system uses, as an initial value $\lambda_0$ of the factor $\lambda$, the calibration value $\lambda_T$ ($\lambda_0=\lambda_T=0.8$).

Operating the engine with this value, $\lambda_0=\lambda_T$ of factor $\lambda$, the ionization current $c_i$ is measured and the curve $c_i(\alpha)$ plotted, which represents the ionization current $c_i$ as a function of the angle $\alpha$ of rotation of the crankshaft for a cycle of the engine.

As illustrated in FIG. 1, on this curve a number of points (P1 . . . Pn) is chosen at regular intervals $\Delta_\alpha$ of the angle $\alpha$ of rotation of the crankshaft and for each point $P_1 \ldots P_n$ the corresponding value of di $c_{i1} \ldots c_{in}$ is read.

For each point, product $c_i \times \Delta_\alpha$ is applied and thereafter the sum of all the products is calculated.

The summing of the products $c_i \times \Delta_\alpha$ represents the value $z_0$ of the parameter z, i.e. the integral from 0° to 360° of the curve $c_i(\alpha)$.

This value $z_0$ of the parameter z remains substantially constant for all the engine cycles in which the engine is operated with an initial value ($\lambda 0$) $\lambda_0=\lambda_T$ of factor $\lambda$.

At this point, the value of factor $\lambda$ is modified, interrupting the supply of the fuel, for example for five cycles, thus taking the initial value $\lambda_0=\lambda_T$ to a new value $\lambda_1$.

The variation of factor $\lambda$, consequent to the interruption of the supply, i.e. the difference between the values $\lambda_1$ and $\lambda_0$ is a positive value $\Delta_\lambda$ lower than or equal to 0.05 ($\Delta_\lambda \leq 0.05$).

Therefore the calculation of the parameter z is repeated on a curve $c_i(\alpha)$ obtained by making the engine function with value $\lambda_1$ of factor $\lambda$, in this way calculating the new value $z_1$.

Then the value of the difference $\Delta_z$ is calculated between two values of the parameter z, i.e. $\Delta_z=z_1-z_0$.

If $\Delta_z$ is $>\Delta_{zrif}$ (for example 477 µA*ms) in absolute value, the regulating system of the engine automatically enriches or weakens the air/fuel mixture according to whether the value of $\Delta_z$ is negative (lean mixture) or respectively positive (rich mixture).

The operations are repeated at regular intervals for the whole period of operation of the engine.

The above-described method can be implemented by means of electronic measuring devices known to technical experts in the sector.

With the above-described method the value z of the integral of the ionization current is further constantly monitored, which can in fact be calculated at each engine cycle.

If the value z is too high or too low, the system can activate safety procedures which enable safeguarding the engine.

In particular the system can activate a first safety procedure if the calculated value z of the integral of the ionization current exceeds a predetermined threshold value $z_{max}$, for example a value of 261 µA*rad, for a time (i.e. a number of engine cycles) of greater than a predetermined value $\Delta t$, for example 20 engine cycles.

This first safety procedure can include deactivating the control procedure described in the foregoing, and controlling the carburation on the basis of the velocity of the engine.

For example, this first safety procedure can include measuring the velocity of the engine, typically the number of revolutions completed by the crankshaft in the time unit, and regulating the quantity of fuel injected so that the velocity of the engine is maintained constant at or nearly so at a predetermined target value $_{tar}$, for example 10000 rpm.

To do this, the system can use a feedback control which includes calculating, for each engine cycle, the difference between a measured value W of the engine velocity, and the target value $W_{tar}$, and regulating the supply of fuel so as to minimize the difference, for example via a proportional control (P), a proportional-integral control (PI) or a proportional-integral-derivative control (PID) which as input uses the difference between the measured value W and the target value $W_{tar}$ of the engine velocity.

This first safety procedure can also be activated in other circumstances, for example should the temperature of the engine exceed a predetermined maximum value, for example 270° C., or should the number of engine revolutions exceed a respective maximum value, for example 10000 rpm.

To activate the safety procedure, it is possible for each of these further conditions to be verified for at least a predetermined length of time.

The control system can further activate a second safety procedure if the calculated value z of the integral of the ionization current falls below a predetermined threshold value $z_{min}$, for example a value of 1.75 µA*rad, for a time (i.e. a number of engine cycles) greater than a predetermined value Δt, for example 20 engine cycles.

In these circumstances it is probable that the spark plug is very dirty and that it is actually not able to provide reliable value of the ionization current, which does not enable controlling the carburation effectively.

In this case, the second safety procedure can simply include causing the shutting down of the engine, for example by supplying the engine with the greatest quantity of fuel possible, i.e. leaving the ON-OFF valve connecting the fuel tank with the injecting nozzle of the carburetor constantly open.

In this way the quantity of fuel injected becomes so high as to rapidly flood the engine which consequently shuts down.

The invention is understood not to be limited to the above-described example, and any variations and improvements can be made thereto without its forsaking the scope of the claims that follow.

The invention claimed is:

1. A control system of carburation of a two-stroke internal combustion engine comprising:
   a. operating the engine with an air/fuel ratio of a predetermined initial value ($\lambda_0$);
   b. for the initial value ($\lambda_0$) of the air/fuel ratio, constructing a first curve ($c_i(\alpha)$) representing an ionization current ($c_i$) as a function of the angular position ($\alpha$) of a crankshaft of the engine, the ionization current ($c_i$) being measured through spark plug electrodes;
   c. calculating a value ($z_0$) equal to an integral of the first curve ($c_i(\alpha)$) in a predetermined angular interval of the crankshaft;
   d. interrupting fuel supply for a few engine cycles, thereby increasing the air/fuel ratio of the engine to a second value ($\lambda_1$) larger than the initial value ($\lambda_0$), the second value ($\lambda_1$) of the air/fuel ratio being equal to the sum of the initial value ($\lambda_0$) and a predetermined quantity ($\Delta_\lambda$), the predetermined quantity ($\Delta_\lambda$) being smaller than or equal to 0.05;
   e. for the second value ($\lambda_1$) of the air/fuel ratio, constructing a second curve ($c_i(\alpha)$) representing the ionization current ($c_i$) as a function of the angular position ($\alpha$) of the crankshaft, the ionization current ($c_i$) being measured through the spark plug electrodes;
   f. calculating a value ($z_1$) equal to an integral of the second curve ($c_i(\alpha)$) in a predetermined angular interval of the crankshaft that is equal to the preceding angular interval;
   g. calculating a difference ($\Delta_z$) as the value ($z_1$) of the integral of the second curve minus the value ($z_0$) of the integral of the first curve;
   h. if the difference ($\Delta z$) has an absolute value greater than a predetermined threshold value ($\Delta_{zrif}$), intervening on the carburation to regulate a quantity of fuel injected, wherein the regulating of the quantity of fuel injected includes increasing the quantity of fuel injected in a case of a negative difference and reducing the quantity of fuel injected in a case of a positive difference, wherein the system provides a continuous and automatic intervention during an entire operating period of the engine and not only when operated at wide open throttle.

2. The control system of claim 1, wherein a first initial value ($\lambda_T$) of the air/fuel ratio is comprised between 75% and 85% of the value of a stoichiometric ratio.

3. The control system of claim 1, wherein the predetermined angular interval on which the integral of the ionization current is calculated is 360° of a crankshaft rotation.

4. The control system of claim 1, wherein the threshold value ($\Delta z_{rif}$) of the difference is equal to or less than 261 µA*rad.

5. The control system of claim 1, wherein the value of the integral of each curve ($c_i(\alpha)$) representing the ionization current ($c_i$) is calculated by:
   selecting, on the curve ($c_i(\alpha)$) a number of points ($P_1 \ldots P_n$) at predetermined intervals ($\Delta_\alpha$) of the rotation angle ($\alpha$) of the crankshaft;
   calculating for each point ($P_1 \ldots P_n$) the product of the value ($c_i$) of the ionization current at that point for the respective angular interval ($\Delta_\alpha$); and
   summing the products relative to all the points ($P_1 \ldots P_n$).

6. The control system of claim 1, wherein the modification of the air/fuel ratio is carried out at regular time intervals.

7. The control system of claim 6, wherein the time intervals have a duration comprised between 10 and 20 seconds.

8. The control system of claim 1, wherein the value (z) of the integral of the ionization current is monitored at each engine cycle and the quantity of fuel injected is regulated so as to maintain a predetermined value of the engine velocity, if the value (z) of the integral of the ionization current exceeds a predetermined threshold value ($z_{max}$).

9. The control system of claim 1, wherein the value (z) of the integral of the ionization current is monitored at each engine cycle and the engine is cut off if the value (z) of the integral of the ionization current is lower than a predetermined threshold value ($z_{min}$).

* * * * *